United States Patent
Tamura et al.

(10) Patent No.: US 12,454,597 B2
(45) Date of Patent: Oct. 28, 2025

(54) POLYESTER RESIN

(71) Applicant: Mitsubishi Chemical Corporation, Tokyo (JP)

(72) Inventors: Yoko Tamura, Tokyo (JP); Tadahiro Ozawa, Tokyo (JP); Yoshihiro Kamon, Tokyo (JP); Takafumi Asai, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 906 days.

(21) Appl. No.: 17/016,712

(22) Filed: Sep. 10, 2020

(65) Prior Publication Data

US 2020/0407493 A1 Dec. 31, 2020

Related U.S. Application Data

(63) Continuation of application No. PCT/JP2019/008329, filed on Mar. 4, 2019.

(30) Foreign Application Priority Data

Mar. 14, 2018 (JP) .................................. 2018-046937

(51) Int. Cl.
*C08G 63/42* (2006.01)
*C08G 63/183* (2006.01)
*C08L 67/02* (2006.01)
*C09D 11/104* (2014.01)

(52) U.S. Cl.
CPC ........... *C08G 63/42* (2013.01); *C08G 63/183* (2013.01); *C08L 67/025* (2013.01); *C09D 11/104* (2013.01); *C08G 2230/00* (2013.01)

(58) Field of Classification Search
CPC .................................................... C08G 63/42
See application file for complete search history.

(56) References Cited

U.S. PATENT DOCUMENTS

| | | | |
|---|---|---|---|
| 6,737,481 B1 | 5/2004 | Kurian et al. | |
| 2017/0037182 A1 | 2/2017 | Kondo et al. | |
| 2017/0088665 A1* | 3/2017 | Inglefield, Jr. | ........... C09D 5/03 |
| 2018/0030298 A1* | 2/2018 | Yamazaki | ........... C09D 11/037 |
| 2018/0067412 A1 | 3/2018 | Ozawa et al. | |
| 2018/0136576 A1 | 5/2018 | Ozawa et al. | |
| 2018/0173124 A1 | 6/2018 | Ozawa et al. | |

FOREIGN PATENT DOCUMENTS

| | | |
|---|---|---|
| CN | 107614571 A | 1/2018 |
| EP | 3 088 438 A1 | 11/2016 |
| JP | 2006-51 1688 A | 4/2006 |
| JP | 2008-239744 A | 10/2008 |
| JP | 2010-285555 A | 12/2010 |
| JP | 2013-256599 A | 12/2013 |
| JP | 2017-27071 A | 2/2017 |
| KR | 10-2016-0088905 A | 7/2016 |
| KR | 10-2017-0140342 A | 12/2017 |
| WO | WO 2015/163400 A1 | 10/2015 |
| WO | WO 2016/186028 A1 | 11/2016 |
| WO | WO 2016/194949 A1 | 12/2016 |

OTHER PUBLICATIONS

Extended European Search Report issued Nov. 10, 2020 in European Patent Application No. 19766831.2, 5 pages.
Japanese Office Action issued Sep. 6, 2022 in Japanese Patent Application No. 2019-517993 (with unedited computer generated English translation), 6 pages.
International Search Report issued Apr. 16, 2019 in PCT/JP2019/008329 file Mar. 4, 2019 (with English translation), 3 pages.
Korean Office Action issued Jan. 28, 2022 in Korean Patent Application No. 10-2020-7025990 (with English translation), 12 pages.
Combined Chinese Office Action and Search Report issued May 9, 2022 in Patent Application No. 201980018119.2 (with English machine translation), 15 pages.
Pang Mingli, et al., "Functional research and applied analysis of erythritol," China Food Safety, Jun. 2011, pp. 64-65.
Nima Esmaeili, et al., "Synthesis and characterization of methacrylated star-shaped poly(lactic acid) employing core molecules with different hydroxyl groups," Journal of Applied Polymer Science, 2017, 13 pages.

\* cited by examiner

*Primary Examiner* — Megan McCulley
(74) *Attorney, Agent, or Firm* — Oblon, McClelland, Maier & Neustadt, L.L.P.

(57) ABSTRACT

A polyester resin including: structural unit (A) represented by a specific formula; structural unit (B) derived from an aliphatic diol having 3 to 8 carbon atoms (provided that the structural unit (A) is excluded); and at least one structural unit (C) selected from the group consisting of structural unit (c1) derived from a trivalent or higher-valent acid component and structural unit (c2) derived from a trihydric or higher-hydric alcohol component, the polyester resin including the structural unit (B) in an amount of 20 molar parts or more with respect to 100 molar parts of all the structural units derived from acid components.

19 Claims, No Drawings

POLYESTER RESIN

This application is a continuation application of International Application No. PCT/JP2019/008329, filed on Mar. 4, 2019, which claims the benefit of priority of the prior Japanese Patent Application No. 2018-046937, filed in Japan on Mar. 14, 2018, the content of which is incorporated herein by reference.

TECHNICAL FIELD

The present invention relates to a polyester resin that reduces environmental load and is excellent in solvent solubility, pulverizability, storage stability at high temperature, and low-temperature fluidity.

Polyester resins are widely used for use applications such as coating materials, adhesives, films, and toners for electrophotography. For such use applications, polyester resins are required to have solubility in general-purpose solvents, pulverizability of the resin, storage stability at high temperature, low-temperature fluidity, and the like.

For example, in order to use a polyester resin in a coating material or an adhesive, solubility in a solvent is required. Furthermore, as a binder resin for toner, storage stability at high temperature, pulverizability of the resin, and low-temperature fluidity are also required.

On the other hand, in recent years, from the viewpoint of environmental protection such as suppression of global warming, switchover from conventional plastics derived from petroleum raw materials to plastics derived from plant raw materials with less environmental load has been attempted, and investigations on polyester resins that use monomers derived from biomass are underway.

For example, Patent Literature 1 describes a polyester resin that uses isosorbide, which is a biomass-derived monomer, and that is used in the fields of fibers, films, and the like, the polyester resin having excellent heat resistance.

Furthermore, Patent Literature 2 describes a polyester resin that uses erythritan, which is a biomass-derived monomer, and that is used in the fields of coating materials and adhesives, the polyester resin having excellent heat resistance.

Furthermore, Related Art Literature 3 discloses, as a technology related to a polyester resin for a toner binder, a technology for enhancing storage stability at high temperature and pulverizability using erythritan.

However, in the technologies described in Patent Literatures 1 to 3, the solvent solubility of the polyester resin was insufficient.

CITATION LIST

Patent Literature

[Patent Literature 1]
  Published Japanese Translation No. Hei 2006-511688 of the PCT International Publication
[Patent Literature 2]
  Japanese Unexamined Patent Application, First Publication No. Hei 2008-239744
[Patent Literature 3]
  Japanese Unexamined Patent Application, First Publication No. Hei 2013-256599

SUMMARY OF INVENTION

Technical Problem

An object of the present invention is to provide a polyester resin that has pulverizability, storage stability at high temperature, and low-temperature fluidity in a well-balanced manner, reduces environmental load by using a monomer derived from biomass, and has satisfactory solvent solubility.

Solution to Problem

The present invention has the following aspects.

[1] A polyester resin including:
structural unit (A) represented by General Formula (1);
structural unit (B) derived from an aliphatic diol having 3 to 8 carbon atoms (provided that the structural unit (A) is excluded); and
at least one structural unit (C) selected from the group consisting of structural unit (c1) derived from a trivalent or higher-valent acid component and structural unit (c2) derived from a trihydric or higher-hydric alcohol component,
in which the polyester resin includes the structural unit (B) in an amount of 20 molar parts or more with respect to 100 molar parts of all the structural units derived from acid components.

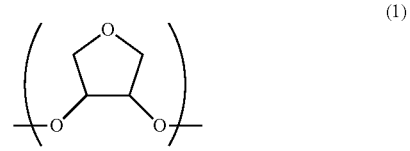
(1)

[2] The polyester resin according to [1], wherein a content of the structural unit (A) is 1 to 20 molar parts with respect to 100 molar parts of all the structural units derived from acid components.

[3] The polyester resin according to [1] or [2], wherein a sum of the structural unit (c1) is 0.5 to 10 mol % with respect to 100 mol % of all the structural units derived from acid components.

[4] The polyester resin according to any one of [1] to [3], wherein a sum of the structural unit (c2) is 0.5 to 10 molar parts with respect to 100 molar parts of all the structural units derived from acid components.

[5] The polyester resin according to any one of [1] to [4], which is amorphous.

[6] The polyester resin according to any one of [1] to [5], wherein the polyester resin has a glass transition temperature of 50° C. to 75° C.

[7] The polyester resin according to any one of [1] to [6], wherein the aliphatic diol having 3 to 8 carbon atoms is at least one selected from the group consisting of neopentyl glycol, 1,2-propanediol, 1,3-propanediol, 1,3-butanediol, 1,4-butanediol, diethylene glycol, triethylene glycol, 1,4-cyclohexanedimethanol, and isosorbide.

[8] The polyester resin according to any one of [1] to [7], wherein the trivalent or higher-valent acid component is at least one selected from the group consisting of trimellitic acid, pyromellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,2,7,8-octanetetracarboxylic acid, and esters or acid anhydrides thereof.

[9] The polyester resin according to any one of [1] to [8], wherein the trihydric or higher-hydric alcohol component is at least one selected from the group consisting of sorbitol, 1,2,3,6-hexatetralol, 1,4-sorbitan, pentaerythritol, dipentaerythritol, tripentaerythritol, 1,2,4-butanetriol, 1,2,5-pentanetriol, glycerol, 2-methyl-1,2,3-propanetriol, 2-methyl-1,2,4-butanetriol, trimethylolpropane, and 1,3,5-trihydroxymethylbenzene.

[10] An ink including the polyester resin according to any one of [1] to [9].

Advantageous Effects of Invention

Since the polyester resin of the present invention uses a monomer derived from biomass, the environmental load can be reduced, and the polyester resin has solvent solubility, pulverizability, storage stability at high temperature, and low-temperature fluidity in a well-balanced manner. Therefore, the polyester resin of the present invention can be suitably used for coating materials, adhesives, films, toners for electrophotography, and the like.

DESCRIPTION OF EMBODIMENTS

<<Polyester Resin>>

The polyester resin of the present invention includes: structural unit (A) represented by General Formula (1); structural unit (B) derived from an aliphatic diol having 3 to 8 carbon atoms (provided that the structural unit (A) is excluded); and at least one structural unit (C) selected from the group consisting of structural unit (c1) derived from a trivalent or higher-valent acid component and structural unit (c2) derived from a trihydric or higher-hydric alcohol component, and the polyester resin includes the structural unit (B) in an amount of 20 molar parts or more with respect to 100 molar parts of all the structural units derived from acid components.

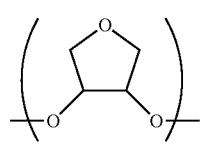

(1)

The polyester resin of the present invention is obtained by polycondensing a mixture of a monomer from which structural unit (A) is derived, a monomer from which structural unit (B) is derived, and a monomer from which structural unit (C) is derived.

Examples of the monomer from which structural unit (A) is derived include a compound represented by General Formula (2) (erythritan). Erythritan is synthesized by, for example, an intramolecular dehydration reaction of erythritol, which is a natural polysaccharide.

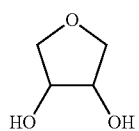

(2)

In general, biomass-derived substances that can be used as raw materials for polyester resins are mainly non-cyclic aliphatic compounds, and when these are used in large quantities, the glass transition temperature (hereinafter, also referred to as "Tg") of a polyester resin obtainable therefrom is lowered to a large extent, which serves as a cause for the deterioration of storage stability at high temperature.

In the present invention, deterioration of storage stability at high temperature is prevented by using a monomer from which structural unit (A) is derived, as a copolymerization component, and the ratio of biomass-derived substances in the entirety of raw materials is increased so that there is an effect of reducing the environmental load. Furthermore, there is effective in enhancing pulverizability.

Furthermore, the content of structural unit (A) is preferably 1 to 20 molar parts, and more preferably 2 to 15 molar parts, with respect to 100 molar parts of all the structural units derived from acid components. When the content is adjusted to be equal to or more than the above-described lower limit, the storage stability at high temperature becomes satisfactory. When the content is adjusted to be equal to or less than the above-described upper limit, the low-temperature fluidity tends to become satisfactory.

Meanwhile, in the present specification, the contents of the respective structural units can be measured by the method that will be described below.

The monomer from which structural unit (B) is derived is an aliphatic diol having 3 to 8 carbon atoms. It is because when the number of carbon atoms is adjusted to 3 or more, the expression of crystallinity of the resin is easily suppressed, and the solvent solubility tends to become satisfactory, while when the carbon number is 8 or less, the storage stability of the resin at high temperature tends to become satisfactory. Examples include neopentyl glycol, 1,2-propanediol, 1,3-propanediol, 1,3-butanediol, 1,4-butanediol, diethylene glycol, triethylene glycol, 1,4-cyclohexanedimethanol, and isosorbide. These can be used singly or in combination of two or more kinds thereof. Furthermore, the monomer may be either a plant-derived substance or a petroleum-derived substance; however, using a plant-derived substance can contribute to a reduction in environmental load.

The content of structural unit (B) is 20 molar parts or more with respect to 100 molar parts of all the structural units derived from acid components. When the content of the structural unit (B) is 20 molar parts or more, the solvent solubility is likely to be enhanced. The content of the structural unit (B) is preferably 25 to 90 molar parts, and more preferably 30 to 85 molar parts, with respect to 100 molar parts of all the structural units derived from acid components. When the content is adjusted to be equal to or more than the above-described lower limit, solvent solubility tends to become satisfactory. When the content is adjusted to be equal to or less than the above-described upper limit, the reactivity and the storage stability at high temperature of the resin tend to become satisfactory.

According to the present invention, it is necessary that at least one structural unit (C) selected from the group consisting of structural unit (c1) derived from a trivalent or higher-valent acid component and structural unit (c2) derived from a trihydric or higher-hydric alcohol component is included.

Examples of the trivalent or higher-valent acid component that can be used in the present invention include trimellitic acid, pyromellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,2,7,8-octanetetracarboxylic acid, and esters or acid anhydrides thereof. Above all, trimellitic acid or anhydride thereof is preferred.

Examples of the trihydric or higher-hydric alcohol component that can be used in the present invention include sorbitol, 1,2,3,6-hexatetralol, 1,4-sorbitan, pentaerythritol, dipentaerythritol, tripentaerythritol, 1,2,4-butanetriol, 1,2,5-pentanetriol, glycerol, 2-methyl-1,2,3-propanetriol, 2-methyl-1,2,4-butanetriol, trimethylolpropane, and 1,3,5-trihydroxymethylbenzene. Above all, trimethylolpropane is preferred.

In a case in which the polyester resin of the present invention includes structural unit (c1), the content of the structural unit (c1) is preferably 0.5 to 10 mol %, and more preferably 1 to 9 mol %, with respect to 100 mol % of all the structural units derived from acid components. In a case in which the content is equal to or more than the above-described lower limit, in a case in which the polyester resin is used for a use application in which the polyester resin is used after being dissolved in a solvent, or in a use application including a step of dissolving the polyester resin in a solvent, exhibition of crystallinity at the time of dissolving in a solvent is suppressed, and the solvent solubility tends to become satisfactory. Furthermore, in a case in which the polyester resin is used as a toner binder, the hot offset resistance tends to become satisfactory. In a case in which the content is equal to or less than the upper limit, the solvent solubility that can suppress the generation of gel component tends to become satisfactory, and the storage stability at high temperature also tends to become satisfactory.

In a case in which the polyester resin of the present invention includes structural unit (c2), the content of the structural unit (c2) is preferably 0.5 to 10 molar parts, and more preferably 1 to 9 molar parts, relative to 100 molar parts of all the structural units derived from acid components. In a case in which the content is equal to or more than the above-described lower limit, in a case in which the polyester resin is used for a use application in which the polyester resin is used after being dissolved in a solvent, or in a use application including a step of dissolving the polyester resin in a solvent, exhibition of crystallinity at the time of dissolving in a solvent is suppressed, and the solvent solubility tends to become satisfactory. Furthermore, in a case in which the polyester resin is used as a toner binder, the hot offset resistance tends to become satisfactory. In a case in which the content is equal to or less than the upper limit, the solvent solubility that can suppress the generation of gel component tends to become satisfactory, and the storage stability at high temperature also tends to become satisfactory.

Furthermore, according to the present invention, acid components other than a trivalent or higher-valent acid component may also be used. Examples include aromatic diacid components, such as divalent carboxylic acids such as terephthalic acid, isophthalic acid, dimethyl terephthalate, dimethyl isophthalate, diethyl terephthalate, diethyl isophthalate, dibutyl terephthalate, and dibutyl isophthalate, and esters or acid anhydrides thereof; and aliphatic diacid components such as phthalic acid, sebacic acid, isodecylsuccinic acid, dodecenylsuccinic acid, maleic acid, fumaric acid, adipic acid, succinic acid, and esters or acid anhydrides thereof, and these can be used singly or in combination of two or more kinds thereof. Furthermore, these may be either plant-derived substances or petroleum-derived substances.

As the alcohol component, an alcohol component other than an aliphatic diol having 3 to 8 carbon atoms or a trihydric or higher-hydric alcohol component may also be used, and for example, ethylene glycol or the like can be used. These can be used singly or in combination of two or more kinds thereof. Furthermore, these may be either plant-derived substances or petroleum-derived substances.

It is preferable that the polyester resin of the present invention is amorphous because the solvent solubility is satisfactory. Here, an amorphous resin refers to a resin that has only a glass transition point but has no melting point.

In order to make the obtained resin amorphous, it is important to regulate the amount of copolymerization of a raw material having a structure that is liable to disturb crystallinity, such as a bent site or a branched site, within the molecule.

<<Method for Producing Polyester Resin>>

Hereinafter, a method for producing the polyester resin of the present invention will be described.

The polyester resin of the present invention can be obtained by performing polycondensation of the above-described alcohol components (including a monomer from which structural unit (A) is derived, a monomer from which structural unit (B) is derived, and a monomer from which structural unit (c2) is derived) and the above-described acid components (including a monomer from which structural unit (c1) is derived).

The method for polycondensation is not particularly limited; however, for example, a method of introducing the above-described alcohol components and acid components into a reaction vessel, and polymerizing the components through an esterification reaction or a transesterification reaction and a condensation polymerization reaction, may be mentioned.

On the occasion of polymerizing a polyester resin, for example, a polymerization catalyst such as titanium tetraalkoxide, titanium oxide, dibutyltin oxide, tin oxide, tin acetate, zinc acetate, tin disulfide, antimony trioxide, germanium dioxide, or magnesium acetate can be used.

The polymerization temperature is not particularly limited; however, the polymerization temperature is preferably 180° C. to 280° C., more preferably 200° C. to 270° C., and even more preferably 220° C. to 270° C. In a case in which the polymerization temperature is equal to or higher than the lower limit, productivity tends to become satisfactory. In a case in which the polymerization temperature is equal to or lower than the upper limit, there is a tendency that decomposition of the resin or the generation of volatile components that cause foul odor can be suppressed.

According to the present invention, if necessary, a polyester resin can be polymerized by adding a modifier component together with the above-described components to the extent that does not impair the effects of the present invention. When a modifier component is added and polymerization is performed, low-temperature fluidity tends to be enhanced, and the dispersibility of the modifier component tends to be enhanced. Regarding the modifier component, for example, a substance similar to a wax that can be used as a toner formulation can be appropriately used, and examples thereof include carnauba wax, rice wax, beeswax, a synthetic ester-based wax, paraffin wax, various polyolefin waxes or modified products thereof, a fatty acid amide, and a silicone wax.

The Tg of the polyester resin of the present invention is preferably 50° C. to 75° C., more preferably 54° C. to 72° C., and even more preferably 57° C. to 72° C. In a case in which the Tg is equal to or higher than the lower limit, storage stability at high temperature tends to become satisfactory. In a case in which the Tg is equal to or lower than the upper limit, low-temperature fluidity and pulverizability tend to become satisfactory.

Incidentally, in this specification, Tg can be measured by the method that will be described later.

The softening temperature of the polyester resin of the present invention is preferably 90° C. to 130° C., and more preferably 100° C. to 120° C. In a case in which the softening temperature is equal to or higher than the lower limit, the storage stability at high temperature tends to become satisfactory. In a case in which the softening temperature is equal to or lower than the upper limit, the low-temperature fluidity tends to become satisfactory.

Incidentally, the softening temperature according to the present specification can be measured by the method that will be described below.

Furthermore, the acid value of the polyester resin of the present invention is preferably 2 to 25 mg KOH/g, more preferably 5 to 20 mg KOH/g, and even more preferably 8 to 18 mg KOH/g. In a case in which the acid value is equal to or higher than the lower limit, the reactivity and the storage stability at high temperature of the resin tend to be enhanced. In a case in which the acid value is equal to or lower than the upper limit, hygroscopic properties tend to become satisfactory.

Incidentally, the acid value according to this specification can be measured by the method that will be described below.

<<Ink>>

The ink of the present invention includes the polyester resin of the present invention.

It is preferable that the ink of the present invention further includes a colorant, a dispersant, and a solvent.

<Colorant>

As the colorant to be used for the present invention, it is preferable to use a pigment. The pigment may be an organic pigment or an inorganic pigment.

The chemical structure of these pigments is not particularly limited; however, organic pigments such as azo-based, phthalocyanine-based, quinacridone-based, benzimidazolone-based, isoindolinone-based, dioxazine-based, indanthrene-based, and perylene-based pigments can be utilized. Furthermore, as colorants other than those, other black colorants can be used in addition to these organic coloring pigments.

Among black colorants, an organic black pigment may be used from the viewpoints of light-shielding properties and color tone. Examples of the organic black pigment include aniline black, perylene black, and cyanine black.

Furthermore, in the present invention, an inorganic black pigment can be used. Examples of the inorganic black pigment include carbon black, acetylene black, lamp black, bone black, graphite, iron black and titanium black. Among these, carbon black can be preferably used from the viewpoints of light-shielding properties and image characteristics. Examples of carbon black include the following carbon blacks.

Furthermore, as a colorant other than those, a dye may also be used in addition to the above-mentioned organic coloring pigments and black colorants. Examples of a dye that can be used as a colorant include azo-based dyes, anthraquinone-based dyes, phthalocyanine-based dyes, quinoneimine-based dyes, quinoline-based dyes, nitro-based dyes, carbonyl-based dyes, and methine-based dyes.

It is preferable that the colorant is included in an amount sufficient for securing the concentration and colorability of a printing ink, that is, at a proportion of 1% to 50% by mass with respect to the total mass of the printing ink.

<Dispersant>

Regarding a dispersant to be used for the present invention, an acrylic dispersant, a urethane-based dispersant, a polyethyleneimine-based dispersant, a polyallylamine-based dispersant, a dispersant formed from a monomer having an amino group and a macromonomer, a polyoxyethylene alkyl ether-based dispersant, a polyoxyethylene diester-based dispersant, a polyether phosphoric acid-based dispersant, a polyester phosphoric acid-based dispersant, a sorbitan aliphatic ester-based dispersant, and an aliphatic modified polyester-based dispersant.

From the viewpoint of ink stability, it is preferable that the dispersant is included at a proportion of 0.05 to 10 mass % with respect to the total weight of the printing ink composition.

<Solvent>

Examples of an organic solvent to be used for the present invention include aromatic hydrocarbon-based solvents such as toluene and xylene; aliphatic hydrocarbon-based solvents such as hexane, octane, and decane; ester-based solvents such as methyl acetate, ethyl acetate, isopropyl acetate, butyl acetate, amyl acetate, ethyl formate, and butyl propionate; alcohol-based solvents such as methanol, ethanol, propanol, butanol, 2-ethylhexanol, and ethylene glycol; ketone-based solvents such as acetone, methyl ethyl ketone, methyl isobutyl ketone, cyclohexanone, and isophorone; ether-based solvents such as dioxane, diethyl ether, and tetrahydrofuran; cellosolve-based solvents such as cellosolve acetate, ethyl cellosolve, butyl cellosolve, and butyl carbitol.

When the concentration is high, the viscosity is high, and application is difficult, while on the other hand, when the concentration is low, the film thickness at the time of application becomes too thin. Therefore, the solid content concentration is adjusted to 20% to 70% by mass, and preferably 30% to 60% by mass, with respect to the total mass of the ink.

<<Method for Producing Ink>>

The ink of the present invention is obtained by subjecting a mixture obtained by adding a colorant, a dispersant, and a solvent, as necessary, to the polyester resin of the present invention, to a dispersing treatment. For the dispersing treatment, a paint conditioner, a sand grinder, a ball mill, a roll mill, a stone mill, a jet mill, a homogenizer, or the like can be used.

EXAMPLES

Examples of the present invention will be shown below; however, the embodiments of the present invention are not intended to be limited to these. The methods for evaluating a resin as shown in the present Example are as follows.
(1) Method for Evaluating Polyester Resin
(Measurement of Resin Composition)

A sample was dissolved in deuterated chloroform, the measurement temperature was set to 50° C., and measurement was made using NMR (JEOL, Ltd., ECS-400) under the following conditions.

1H: Observation frequency 400 MHz, cumulative frequency 256 times

13C: Observation frequency 100 MHz, cumulative frequency 10,000 times (Glass Transition Temperature (Tg): Index of Storage Stability at High Temperature)

A cell was produced by precisely weighing 10±0.5 mg of a sample in an aluminum pan, and the cell was heated on a hot plate at 100° C. for 10 minutes and then was rapidly cooled by being brought into close contact with dry ice. Next, measurement was made using a differential scanning calorimeter DSC-60 manufactured by Shimadzu Corporation, from room temperature to 90° C. at a rate of temperature increase of 10° C./min. The temperature at an intersection of the baseline on the lower temperature side of the measured chart and the tangent line of the endothermic curve in the vicinity of the glass transition temperature was determined, and the temperature was designated as Tg.

Based on the Tg measurement results, the storage stability at high temperature was evaluated according to the following criteria.
A (satisfactory): Tg is 57° C. or higher.
B (usable): Tg is 50° C. or higher and lower than 57° C.
C (poor): Tg is lower than 50° C.
(Softening Temperature: Index of Low-Temperature Fluidity)

When measurement was made using a flow tester CFT-500 manufactured by Shimadzu Corporation with a nozzle of 1 mmφ×1 mm under a load 196 N (20 Kgf) under constant-rate temperature increase at a rate of temperature increase of 6° C./min, the temperature at which ½ of 1.0 g of a sample had flowed out was determined.

Based on the softening temperature measurement results, the low-temperature fluidity was evaluated according to the following criteria.
A (satisfactory): The softening temperature is 120° C. or lower.
B (usable): The softening temperature is higher than 120° C. and 130° C. or lower.
C (poor): The softening temperature is higher 130° C.
(Acid Value)

About 0.2 g of a sample was precisely weighed in an Erlenmeyer flask with a side arm (A (g)), 10 ml of benzyl alcohol was added thereto, and the resin was dissolved by heating for 15 minutes with a heater at 230° C. in a nitrogen atmosphere. After naturally cooling to room temperature, 10 ml of benzyl alcohol, 20 ml of chloroform, and a few drops of a phenolphthalein solution were added thereto, and the solution was titrated with a 0.02 Normal KOH solution (titration amount=B (ml), titer of KOH solution=p). A blank measurement was similarly carried out (titration amount=C (ml)), and the acid value was calculated according to the following formula.

Acid value(mg KOH/g)=$(B-C)\times 0.02\times 56.11\times p\div A$ (Solvent Solubility)

About 0.5 g of a sample was weighed (D (g)) in a 100-ml Erlenmeyer flask, 50 ml of methyl ethyl ketone (MEK) was added thereto, and the mixture was immersed in a water bath set at 70° C. for 3 hours. On the other hand, a glass filter 1GP100 was tightly filled with Celite 545 up to sixty to seventy percent, and the glass filter was dried in a vacuum dryer set at 105° C. for 3 hours or longer and was weighed (E (g)).

Subsequently, the MEK solution in which the polyester resin was dissolved was transferred into the dried glass filter and was suction filtered. All the contents remaining on the wall inside the Erlenmeyer flask were transferred into the glass filter using MEK, and MEK was caused to flow through the glass filter to drop all soluble components into a suction bottle. Suction was continued so that MEK would not remain in the glass filter, and then the glass filter was dried in a vacuum dryer at 80° C. for 3 hours or longer and weighed (F (g)).

The MEK-insoluble matter content was calculated according to the following formula.

MEK-insoluble matter content(mass %)=$\{(F-E)/D\}\times 100$

The solvent solubility was evaluated based on the calculated values according to the following criteria.
A (satisfactory): The MEK-insoluble matter content is less than 0.1% by mass.
B (usable): The MEK-insoluble matter content is 0.1% by mass or more and less than 0.5% by mass.
C (poor): The MEK-insoluble matter content is 0.5% by mass or more.
(Pulverizability)

A pulverized resin was passed through a sieve, and particles that had passed through 16 mesh (sieve opening 1 mm) but not through 22 mesh (sieve opening 710 μm) were collected. 10.00 g of these particles was precisely weighed (G (g)), and the particles were pulverized for 10 seconds using a TRIO BLENDER pulverizer manufactured by Trioscience, Ltd., and were passed through a 30-mesh (sieve opening 500 μm) sieve. Particles that had not passed through this were collected and precisely weighed (H (g)), and the residual ratio was calculated by the following formula.

Residual ratio(%)=$(H/G)\times 100$

The pulverizability was evaluated based on the calculated values according to the following criteria.
S (very satisfactory): The residual ratio is less than 55%.
A (satisfactory): The residual ratio is 55% or more and less than 65%.
B (usable): The residual ratio is 65% or more and less than 75%.
C (poor): The residual ratio is 75% or more.
(Synthesis of Erythritan)

214.0 g (1.75 mol) of erythritol and 23.1 g (0.2 mol) of a 85 mass % aqueous solution of phosphoric acid were introduced into a 300-ml four-necked flask equipped with a thermometer and a Claisen tube wound with a thermal insulation material. Furthermore, a Liebig condenser, a thermometer, a bifurcated adapter, a flask, a pressure gauge, a trap that was treated so as not to be blocked by frozen water, a vacuum pump, and a pressure regulator were connected. The flask was heated in an oil bath while being stirred with a magnetic stirrer. After the internal temperature reached 135° C., the vacuum pump was started to initiate pressure reduction, and the pressure was slowly decreased. Erythritan and a portion of water that had been produced by the reaction and distilled were condensed in a Liebig condenser and were collected in a flask attached to a bifurcated adapter. The water that was not condensed in the Liebig condenser was collected in a trap cooled with liquid nitrogen. When 50 ml of the distillate was collected in the flask, the vacuum was terminated, 72.5 g (0.59 mol) of erythritol was supplied thereto, and then the vacuum pump was started to re-initiate the collection of erythritan. Thereafter, the supply of erythritol was repeated thirteen times by a similar operation, and then the reaction was continued until distillation of erythritan was terminated. The total amount of erythritol used was 1229.0 g (10.1 mol). The temperature of the reaction liquid reached 135° C. to 150° C., and the pressure finally reached 150 Pa.

The erythritan collected in the flask was analyzed by gas chromatography, and the purity of erythritan was analyzed. The acquired amount of erythritan including water was 1001.7 g, the purity was 96% by mass, the water content was 3% by mass, and the yield was 92%. The mass of the residue remaining in the 300-ml flask was 62.8 g.

Example 1

The acid components and alcohol components shown in Table 1 and tetra-n-butoxytitanium in an amount of 150 ppm with respect to the total amount of all components were introduced into a reaction vessel equipped with a distillation column. Meanwhile, the feed composition of each acid component described in Table 1 is mol % of each component when the total amount of acid components is denoted as 100 mol %. The feed composition of each alcohol component is molar parts of each component when the total amount of acid components is denoted as 100 molar parts. The content of the modifier is parts by mass when the total amount of the acid components and alcohol components is denoted as 100 parts by mass.

Next, the speed of rotation of a stirring blade in the reaction vessel was maintained at 120 rpm, temperature increase was initiated, the reaction system was heated such that temperature in the reaction system would reach 265° C., and this temperature was maintained. After the esterification reaction was completed and distillation of water from the reaction system no longer proceeded, the temperature in the reaction system was lowered and maintained at 235° C., the pressure in the reaction vessel was reduced over about 40 minutes, the degree of vacuum was adjusted to 133 Pa, and a condensation reaction was performed while the diol component was distilled from the reaction system.

Along with the reaction, the viscosity of the reaction system increased, the degree of vacuum was increased together with viscosity increase, and the condensation reaction was carried out until the torque of the stirring blade reached a value representing the desired softening temperature. Then, stirring was stopped at the time point when a predetermined torque was shown, the reaction system was returned to normal pressure, the reaction product was taken out by increasing pressure with nitrogen, and a polyester resin was obtained. The composition of the polyester resin thus obtained is shown in Table 1, and the characteristic values are shown in Table 2.

For the resin thus obtained, evaluation was conducted using the evaluation methods described above. Table 2 shows the results.

Examples 2 to 8 and Comparative Examples 1 to 5

A polyester resin was obtained in the same manner as in Example 1, except that the acid components and the alcohol components were changed as shown in Table 1, and evaluation was carried out similarly. The compositions of the polyester resins thus obtained are shown in Table 1, and the characteristic values and evaluation results are shown in Table 2.

TABLE 1

| | | | Example 1 | Example 2 | Example 3 | Example 4 | Example 5 | Example 6 | Example 7 | Example 8 |
|---|---|---|---|---|---|---|---|---|---|---|
| Feed composition | Acid component (mol %) | Terephilialic acid | 70 | 70 | 50 | 50 | 50 | 1 | 50 | 70 |
| | | Isophthalic acid | 30 | 30 | 50 | 50 | 50 | 98 | 47 | 30 |
| | | Trimellitic anhydride | | | | | | | 3 | |
| | | Fumaric acid | | | | | | | | |
| | | Adipic acid | | | | | | 1 | | |
| | Alcohol component (molar parts) | Erythritan | 5 | 10 | 5 | 5 | 5 | 10 | 5 | 0.8 |
| | | Ethylene glycol | 23 | 18 | 47 | 72 | 12 | 20 | 55 | 27.2 |
| | | Neopentyl glycol | 70 | 70 | 50 | 25 | 85 | 65 | 50 | 70 |
| | | Trimethylolpropane | 7 | 7 | 1 | 3 | 3 | 5 | | 7 |
| | Modifier (parts by mass) | Rice wax | | | | | | 2 | | |
| Resin composition | Acid component (mol %) | Terephilialic acid | 70 | 70 | 50 | 50 | 50 | 1 | 50 | 70 |
| | | Isophthalic acid | 30 | 30 | 50 | 50 | 50 | 98 | 47 | 30 |
| | | Trimellitic anhydride | | | | | | | 3 | |
| | | Fumaric acid | | | | | | | | |
| | | Adipic acid | | | | | | 1 | | |
| | Alcohol component (molar parts) | Erythritan | 5 | 10 | 5 | 5 | 5 | 10 | 5 | 0.8 |
| | | Ethylene glycol | 19 | 15 | 43 | 67 | 9 | 19 | 51 | 26 |
| | | Neopentyl glycol | 70 | 69 | 49 | 25 | 84 | 65 | 50 | 70 |
| | | Trimethylolpropane | 7 | 7 | 1 | 3 | 3 | 5 | | 7 |
| | Modifier (parts by mass) | Rice wax | | | | | | 2 | | |

| | | | Comparative Example 1 | Comparative Example 2 | Comparative Example 3 | Comparative Example 4 | Comparative Example 5 |
|---|---|---|---|---|---|---|---|
| Feed composition | Acid component (mol %) | Terephilialic acid | 70 | 1 | 70 | 50 | 50 |
| | | Isophthalic acid | 30 | 98 | 30 | 50 | 50 |
| | | Trimellitic anhydride | | | | | |
| | | Fumaric acid | | | | | |
| | | Adipic acid | | 1 | | | |
| | Alcohol component (molar parts) | Erythritan | | | 5 | 5 | 5 |
| | | Ethylene glycol | 28 | 25 | 100 | 50 | 82 |
| | | Neopentyl glycol | 70 | 70 | | 50 | 15 |
| | | Trimethylolpropane | 7 | 5 | | | 3 |
| | Modifier (parts by mass) | Rice wax | | 2 | | | |
| Resin composition | Acid component (mol %) | Terephilialic acid | 70 | 1 | 70 | 50 | 50 |
| | | Isophthalic acid | 30 | 98 | 30 | 50 | 50 |
| | | Trimellitic anhydride | | | | | |
| | | Fumaric acid | | | | | |
| | | Adipic acid | | 1 | | | |

TABLE 1-continued

|  |  |  |  |  |  |  |  |
|---|---|---|---|---|---|---|---|
| Alcohol component (molar parts) | Erythritan | | | 5 | 5 | 5 |
| | Ethylene glycol | 25 | 25 | 97 | 46 | 79 |
| | Neopentyl glycol | 69 | 70 | | 50 | 15 |
| | Trimethylolpropane | 7 | 5 | | | 3 |
| Modifier (parts by mass) | Rice wax | | 2 | | | |

TABLE 2

|  |  | Example 1 | Example 2 | Example 3 | Example 4 | Example 5 | Example 6 | Example 7 | Example 8 |
|---|---|---|---|---|---|---|---|---|---|
| Physical properties of resin | Tg (° C.) | 60.8 | 62.2 | 60.8 | 58 | 61.1 | 58.8 | 59.0 | 58.6 |
| | Curing temperature (° C.) | 110.2 | 110.8 | 110.2 | 108.9 | 110.9 | 112 | 107.3 | 111.8 |
| | Acid value (mg KOH/g) | 15.7 | 14 | 15.8 | 16.3 | 11.2 | 19.7 | 12.1 | 11.5 |
| | Storage stability at high temperature | A | A | A | A | A | A | A | A |
| | Low-temperature fluidity | A | A | A | A | A | A | A | A |
| Evaluation results | Solvent solubility Measured value (mass %)/evaluation | 0.1/A | 0.2/A | 0/S | 0.3/A | 0.2/A | 0.2/A | 0.3/A | 0.1/A |
| | Pulverizability Measured value (%)/evaluation | 61/A | 47/S | 55/A | 58/A | 52/S | 59/A | 60/A | 71/13 |

|  |  | Comparative Example 1 | Comparative Example 2 | Comparative Example 3 | Comparative Example 4 | Comparative Example 5 |
|---|---|---|---|---|---|---|
| Physical properties of resin | Tg (° C.) | 58.4 | 48.2 | 56.1 | 60.3 | 56.3 |
| | Curing temperature (° C.) | 111.6 | 107.3 | 108.9 | 111.1 | 107.7 |
| | Acid value (mg KOH/g) | 11.6 | 17.7 | 17.1 | 10.8 | 16.6 |
| | Storage stability at high temperature | A | C | B | A | B |
| | Low-temperature fluidity | A | A | A | A | A |
| Evaluation results | Solvent solubility Measured value (mass %)/evaluation | 0.2/A | 0.1/A | 8.8/C | 0.5/C | 3/C |
| | Pulverizability Measured value (%)/evaluation | 76/C | 72/B | 73/B | 60/A | 45/S |

Example Comparative 1 that did not include structural unit (A) exhibited poor pulverizability.

Comparative Example 2 that did not include structural unit (A) and had a low Tg exhibited poor storage stability at high temperature.

In Comparative Example 3 that did not include structural unit (B), crystallinity was exhibited at the time of being dissolved in a solvent, and the solvent solubility was poor.

Comparative Example 4 that did not include structural unit (C) exhibited poor solvent solubility.

Comparative Example 5 in which the content of structural unit (B) was less than 20 molar parts exhibited poor solvent solubility.

INDUSTRIAL APPLICABILITY

Since the polyester resin of the present invention uses a biomass-derived monomer, the environmental load can be reduced, and also, the polyester resin has solvent solubility, pulverizability, storage stability at high temperature, and low-temperature fluidity in a well-balanced manner. Therefore, the polyester resin of the present invention can be suitably used for inks, coating materials, adhesives, films, toners for electrophotography, and the like.

The invention claimed is:

1. A polyester resin, comprising:
   at least one structural unit (A) represented by General Formula (1):

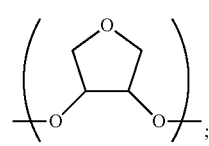

(1)

at least one structural unit (B) selected from the group consisting of neopentyl glycol, 1,2-propanediol, 1,3-propanediol, 1,3-butanediol, 1,4-butanediol, diethylene glycol, triethylene glycol, and 1,4-cyclohexanedimethanol; and
   at least one structural unit (C) selected from the group consisting of structural unit (c1) derived from a trivalent or higher-valent acid component and structural unit (c2) derived from a trihydric or higher-hydric alcohol component,
   wherein the polyester resin includes the structural unit (B) in an amount of 20 molar parts or more with respect to 100 molar parts of all the structural units derived from acid components, wherein the acid components are carboxylic acid components,
every structural unit in the polyester resin that is derived from an acid is derived from a carboxylic acid, and
every structural unit in the polyester resin that is a diol consists of a structural unit (A), a structural unit (B), or an ethylene glycol unit.

2. The polyester resin according to claim 1, wherein a content of the structural unit (A) is 1 to 20 molar parts with respect to 100 molar parts of all the structural units derived from acid components.

3. The polyester resin according to claim 1, wherein a sum of the structural unit (c1) is 0.5 to 10 mol % with respect to 100 mol % of all the structural units derived from acid components.

4. The polyester resin according to claim 3, wherein (c1) is at least one selected from the group consisting of trimellitic acid, pyromellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,2,7,8-octanetetracarboxylic acid, and esters or acid anhydrides thereof.

5. The polyester resin according to claim 3, wherein (c1) is trimellitic acid, or esters or acid anhydrides thereof.

6. The polyester resin according to claim 1, wherein a sum of the structural unit (c2) is 0.5 to 10 molar parts with respect to 100 molar parts of all the structural units derived from acid components.

7. The polyester resin according to claim 6, wherein (c2) is at least one selected from the group consisting of sorbitol, 1,2,3,6-hexatetralol, 1,4-sorbitan, pentaerythritol, dipentaerythritol, tripentaerythritol, 1,2,4-butanetriol, 1,2,5-pentanetriol, glycerol, 2-methyl-1,2,3-propanetriol, 2-methyl-1,2,4-butanetriol, trimethylolpropane, and 1,3,5-trihydroxymethylbenzene.

8. The polyester resin according to claim 6, wherein (c2) is trimethylolpropane.

9. The polyester resin according to claim 1, wherein the polyester resin is amorphous.

10. The polyester resin according to claim 1, wherein the polyester resin has a glass transition temperature of 50° C. to 75° C.

11. An ink comprising the polyester resin according to claim 1.

12. The polyester resin according to claim 1, wherein the structural unit (A) is erythritan.

13. The polyester resin according to claim 1, wherein the structural unit (B) is neopentyl glycol.

14. The polyester resin according to claim 1, wherein the structural unit (A) is erythritan,
(c1) is at least one selected from the group consisting of trimellitic acid, pyromellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,2,7,8-octanetetracarboxylic acid, and esters or acid anhydrides thereof, and
(c2) is at least one selected from the group consisting of sorbitol, 1,2,3,6-hexatetralol, 1,4-sorbitan, pentaerythritol, dipentaerythritol, tripentaerythritol, 1,2,4-butanetriol, 1,2,5-pentanetriol, glycerol, 2-methyl-1,2,3-propanetriol, 2-methyl-1,2,4-butanetriol, trimethylolpropane, and 1,3,5-trihydroxymethylbenzene.

15. The polyester resin according to claim 1, wherein
the structural unit (A) is erythritan,
the structural unit (B) is neopentyl glycol,
(c1) is trimellitic acid, or esters or acid anhydrides thereof, and
(c2) is trimethylolpropane.

16. The polyester resin according to claim 1, wherein a content of the structural unit (A) is 2 to 15 molar parts with respect to 100 molar parts of all the structural units derived from acid components.

17. The polyester resin according to claim 1, wherein a content of the structural unit (B) is 30 to 85 molar parts with respect to 100 molar parts of all the structural units derived from acid components.

18. The polyester resin according to claim 1, wherein a sum of the structural unit (c1) is 1 to 9 mol % with respect to 100 mol % of all the structural units derived from acid components.

19. The polyester resin according to claim 1, wherein a sum of the structural unit (c2) is 1 to 9 molar parts with respect to 100 molar parts of all the structural units derived from acid components.

* * * * *